United States Patent
Poligny et al.

(10) Patent No.: US 9,152,961 B2
(45) Date of Patent: Oct. 6, 2015

(54) MESSAGE MULTIPLEXING METHOD, DEVICE AND CORRESPONDING PROGRAM

(75) Inventors: Jean-Roch Poligny, Bourg-les-valence (FR); Vincent Gomes, Valence (FR); Sébastien James, Valence (FR); Jessica Royer, Valence (FR); Jean-Christophe Pommaret, Tain-L'Hermitage (FR); Jérôme Grandemenge, Colombes (FR)

(73) Assignee: Ingenico Group, Paris (FR)

( * ) Notice: Subject to any disclaimer, the term of this patent is extended or adjusted under 35 U.S.C. 154(b) by 0 days.

(21) Appl. No.: 14/111,705

(22) PCT Filed: Apr. 5, 2012

(86) PCT No.: PCT/EP2012/056317
§ 371 (c)(1),
(2), (4) Date: Dec. 23, 2013

(87) PCT Pub. No.: WO2012/139976
PCT Pub. Date: Oct. 18, 2012

(65) Prior Publication Data
US 2014/0108255 A1    Apr. 17, 2014

(30) Foreign Application Priority Data
Apr. 13, 2011  (FR) ...................... 11 01142

(51) Int. Cl.
*G06Q 20/00* (2012.01)
*G06Q 40/00* (2012.01)
(Continued)

(52) U.S. Cl.
CPC .............. *G06Q 20/382* (2013.01); *G06Q 20/40* (2013.01); *H04L 41/0806* (2013.01); *H04L 67/14* (2013.01)

(58) Field of Classification Search
CPC ............................ G06Q 20/40; G06Q 20/382
USPC ............................................. 705/44; 370/463
See application file for complete search history.

(56) References Cited

U.S. PATENT DOCUMENTS

| | | | |
|---|---|---|---|
| 6,728,210 | B1 | 4/2004 | El-Khoury et al. |
| 2004/0042450 | A1 | 3/2004 | Monroe et al. |

(Continued)

FOREIGN PATENT DOCUMENTS

KR       20030064329 A       7/2003

OTHER PUBLICATIONS

International Search Report dated Jun. 11, 2012 for corresponding International Patent application No. PCT/EP2012/056317 filed on Apr. 5, 2012.

(Continued)

*Primary Examiner* — Jagdish Patel
(74) *Attorney, Agent, or Firm* — David D. Brush; Westman, Champlin & Koehler, P.A.

(57) ABSTRACT

A method is provided for multiplexing messages exchanged between a payment terminal and a communication terminal via a connection between the payment terminal and the communication terminal using the iPod Accessory Protocol, iAP. The method includes: an initialization step of initializing an external communication interface with the communication terminal, a first transmission step of transmitting, to the communication terminal, a request for creation of remote virtual channels via the external communication interface; a creation step of creating, within the payment terminal, local virtual channels corresponding to the remote virtual channels; and a second transmission step of transmitting data frames associated with the local virtual channels via the external communication interface.

8 Claims, 3 Drawing Sheets

Figure 2:
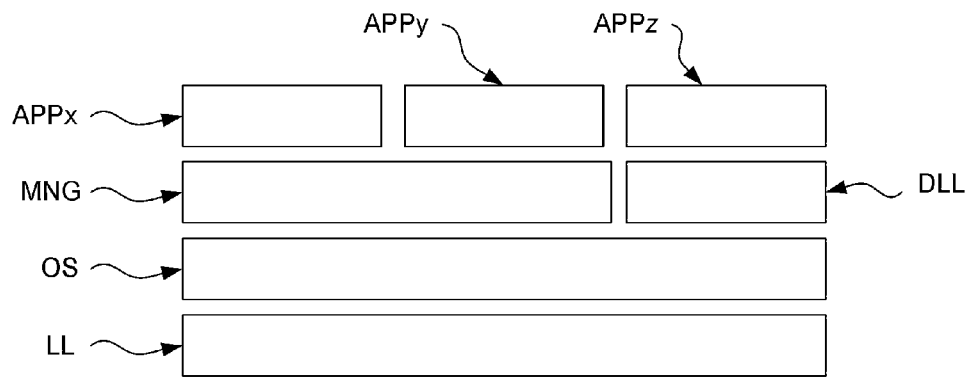

(51) Int. Cl.
*G06Q 20/38* (2012.01)
*G06Q 20/40* (2012.01)
*H04L 29/08* (2006.01)
*H04L 12/24* (2006.01)

(56) References Cited

U.S. PATENT DOCUMENTS

2008/0114699 A1 5/2008 Yuan et al.
2009/0222659 A1 9/2009 Miyabayashi et al.

OTHER PUBLICATIONS

Adrian Game: "Ipod Accessory Serial Protocol", XP002661151, Sep. 13, 2009, pp. 1-7, XP002661151 URL: http://www.adriangame.co.uk/ipod-acc-pro.html.

English translation of the Written Opinion dated Jun. 11, 2012 for corresponding International Patent application No. PCT/EP2012/056317 filed on Apr. 5, 2012.

French Search Report dated Oct. 13, 2011 for corresponding French Application No. 1101142, filed Apr. 13, 2011.

MESSAGE MULTIPLEXING METHOD, DEVICE AND CORRESPONDING PROGRAM

CROSS-REFERENCE TO RELATED APPLICATIONS

This Application is a Section 371 National Stage Application of International Application No. PCT/EP2012/056317, filed Apr. 5, 2012, which is incorporated by reference in its entirety and published as WO 2012/139976 on Oct. 18, 2012, not in English.

FIELD OF THE INVENTION

The present invention pertains to the field of electronic payment terminals. More particularly, the present invention pertains to a novel type of electronic payment device that can be paired. The invention also pertains more particularly to the transmission of data between two terminals forming the electronic payment device.

PRIOR ART SOLUTIONS

At present, payment terminals are used mostly to enable payment for purchases of goods and services at sales points. These terminals generally include a smartcard reader and a magnetic card reader. They also have a screen used in particular to view information such as the amounts involved in the transactions and a keypad for entering these amounts as well as confidential codes, entered by the customers, or again they have a touch-sensitive screen.

The most recent terminals are connected to cash registers and/or to computers by means of communications networks. Such connections can be cable connections, for example of the Ethernet type, or they can be wireless connections. These connections are used for example to link up to an authentication server or to a bank server in order to obtain an authorization of debit.

In order to be able to communicate with the exterior and especially with bank servers, the terminal payments therefore use one or more connection means. One of these means consists of the use of a wireless communications network, for example a GPRS (General Packet Radio Service) network. In this case, the payment terminal acts autonomously. The payment terminal is provided with a SIM (Subscriber Identity Module) card. This is a chip containing a microcontroller and memory. This SIM card is associated with a telephone subscription (of a data transmission type) which must be paid by the merchant. Apart from the fact that this type of subscription is relatively costly, the communications functions are assigned to the payment terminal. Thus, in addition to the payment functions, the terminal must manage communications functions which are not naturally the functions expected of a payment terminal.

To mitigate the problem of subscription costs associated with the GPRS communication in particular, novel types of payments terminals communicate by means of a WiFi (Wireless Fidelity) type of network for example. The merchant then is no longer obliged to take out a particular subscription. The payment terminal can link up to the merchant's WiFi network and access the bank servers in the same way as in the wire connection. However, the use of the payment terminal is then limited to the coverage zone of the WiFi network, which is not suited to nomadic use (for example for a doctor visiting his patients or for a taxi driver).

Figure 1:
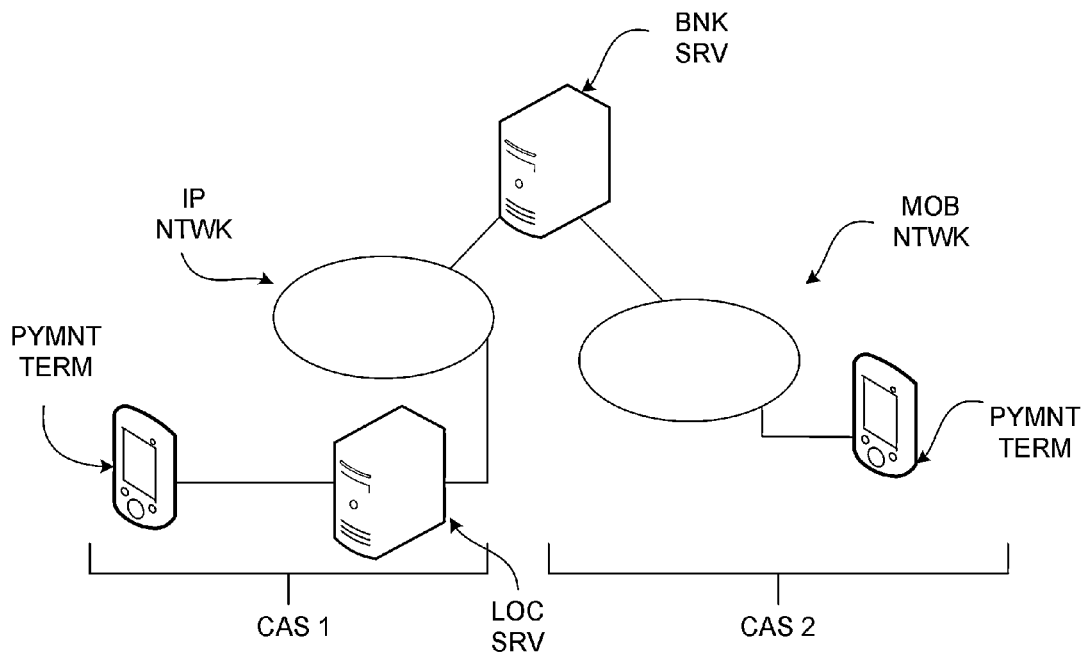

Referring to FIG. 1, we present the general hardware architecture in which the payment terminal operates to enable the performance of a banking transaction when the terminal is not autonomous (Case 1) and when it is autonomous (Case 2).

Thus there is a need to propose a payment terminal that can be used by nomadic merchants, hence through the use of a wireless communications network and, at the same time, to reduce the costs of using such a payment terminal to the minimum. To this end, it is thus proposed to pair the payment terminal with an existing communications terminal (for example an iPhone™ or an iPod™), to form a paired terminal. The paired terminal naturally comprises numerous functions which are absent from the payment terminal when it is not paired.

The problem is that any novel payment terminal must undergo a series of certification tests. These certification tests are called "PCI/PED" tests. They are extremely costly. The makers of payment terminals are therefore careful to have these tests performed in the right conditions.

Thus, there is therefore a need to propose a payment terminal that can be paired with a communications terminal to form a paired terminal without requiring fresh certification tests whenever it is desired to pair a new version or a new type of communications terminal (for example a new iPhone™ or a new iPod™)

SUMMARY OF THE INVENTION

The invention pertains more particularly to a method for multiplexing messages exchanged between a payment terminal and a communications terminal by means of a connection between said payment terminal and said communications terminal using the iAP protocol. According to the invention, such a method comprises:
  a step for initializing an external communications interface with said communications terminal;
  a first step of transmission of a request for creating remote virtual channels, from said payment terminal to said communications terminal through said external communications interface;
  a step for creating, within said payment terminal, local virtual channels corresponding to said remote virtual channels;
  a second step of transmission of associated data frames to said local virtual channels by means of said external communications interface.

Thus, the invention makes it possible to carry out a data transmission by means of numerous channels in using a serial communications interface.

According to one particular characteristic, said external communications interface is an RS232 interface.

According to one particular embodiment, said method further comprises, prior to said step for initializing a communications interface, a step for authenticating said payment terminal in relation to said communications terminal comprising:
  a step for obtaining an authentication certificate; and
  a step for verifying the authorization of the payment terminal to be paired with said communications terminal by means of said authentication certificate.

According to one particular embodiment, said second step for transmitting associated data frames to said local virtual channels comprises:
  a step for verifying a presence, within said virtual channels, of an FLV frame for the communications terminal;
  and when one of the channels comprises such a frame:
  a step for encapsulating said FLV frame in an iAP message.

According to one particular characteristic, said virtual channels belong to the group comprising:
- a virtual "transaction" channel for exchanging data on banking transactions;
- a virtual "configuration" channel for exchanging pieces of service information;
- a virtual "SSL" channel for encrypting data transmission between said payment terminal and said communications terminal;
- a virtual "printer" channel for transmitting printing data;
- a virtual "barcode" channel for managing the reading of the barcodes.

According to one particular characteristic, a virtual channel is created in the form of a queue, said queue being configured to enable the reception, recording and erasure of FLV frames intended for said virtual channel.

According to another aspect, the invention also pertains to a device for multiplexing messages exchanged between a payment terminal and a communications terminal by means of a connection between said payment terminal and said communications terminal using the iAP protocol.

According to the invention, such a device comprises:
- means for initializing an external communications interface with said communications terminal;
- means of transmission of a request for creating remote virtual channels, from said payment terminal to said communications terminal through said external communications interface;
- means for creating, within said payment terminal, local virtual channels corresponding to said remote virtual channels;
- means of transmission of associated data frames to said local virtual channels by means of said external communications interface.

According to a preferred implementation, the different steps of the method according to the invention are implemented by a computer software program, this software program comprising software instructions intended for execution by a data processor of a payment terminal according to the invention and being designed to command the execution of the different steps of this method.

Consequently, the invention also seeks to obtain a program capable of being executed by a computer or by a data processor, this program comprising instructions to command the execution of the steps of a method as mentioned here above.

This program can use any programming language whatsoever, and can be in the form of source code, object code or intermediate code between source code and object code, such that it is in a partially compiled form or in any other desired form whatsoever.

The invention is also aimed at obtaining an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectric circuit ROM or again a magnetic recording means, for example a floppy disk or a hard disk drive.

Furthermore, the information carrier can be a transmissible carrier such as an electrical or optical signal which can be conveyed by an electrical or optical cable, by radio or by other means. The program according to the invention can be especially downloaded from an Internet type network.

Alternatively, the information carrier can be an integrated circuit into which the program is incorporated, the circuit being adapted to executing the method in question or to being used for its execution.

According to one embodiment, the invention is implemented by means of software and/or hardware components. In this respect, the term "module" can correspond in this document both to a software component and to a hardware component or to a set of hardware and software components.

A software component corresponds to one or more computer programs, one or more sub-programs of a program or more generally to any element of a program or an item of software capable of implementing a function or a set of functions according to what is described here below. A software component of this kind is executed by a data processor of a physical entity (a payment terminal) and can access hardware resources of this physical entity (memories, recording media, communications buses, input/output electronic boards, user interfaces, etc).

In the same way, a hardware component corresponds to any element of a hardware unit capable of implementing a function or a set of functions according to what is described here below for the module concerned. It can be a programmable hardware component or a component with an integrated processor for the execution of software, for example an integrated circuit, a smartcard, a memory card, an electronic board for the execution of firmware, etc.

LIST OF FIGURES

Figure 3:
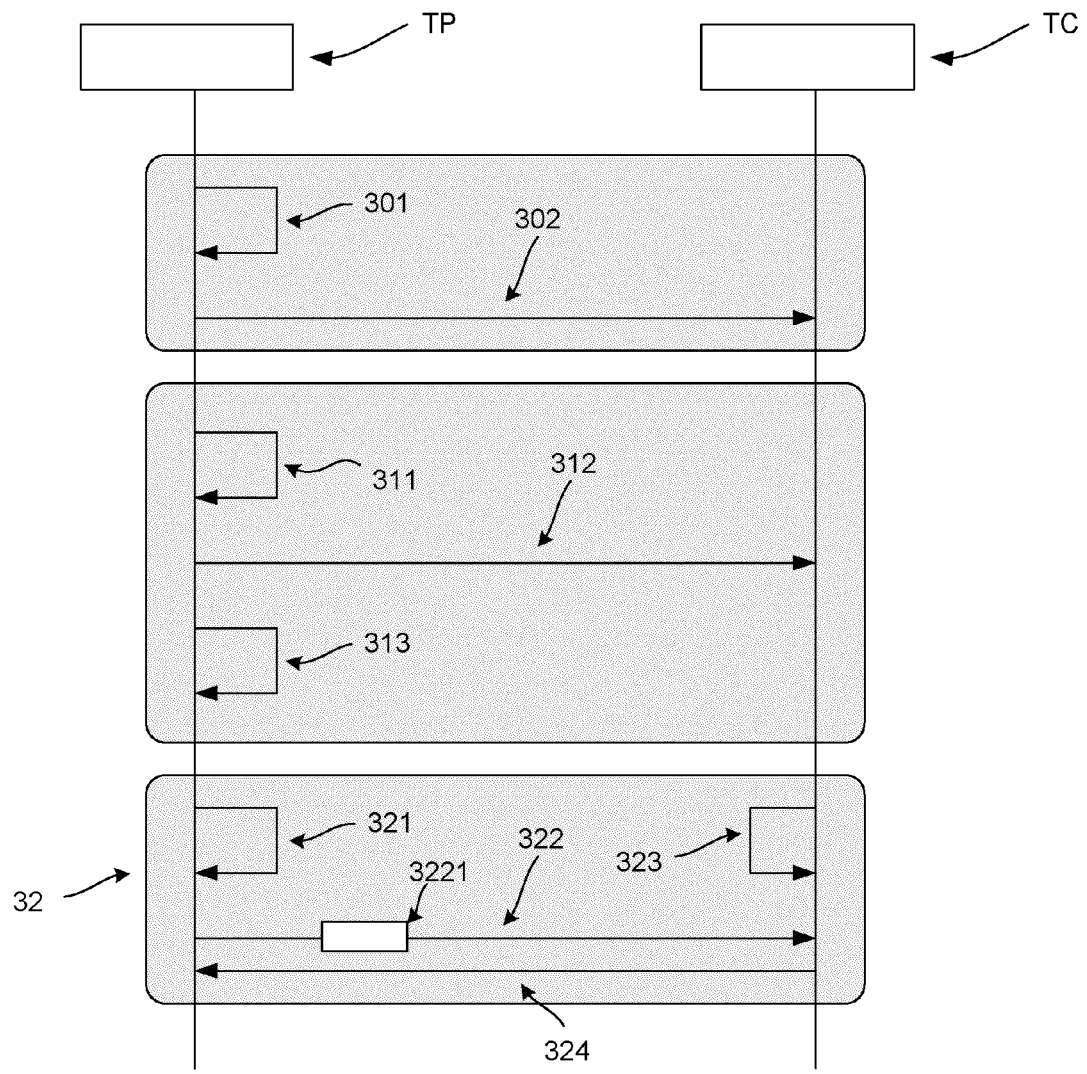
Figure 4:
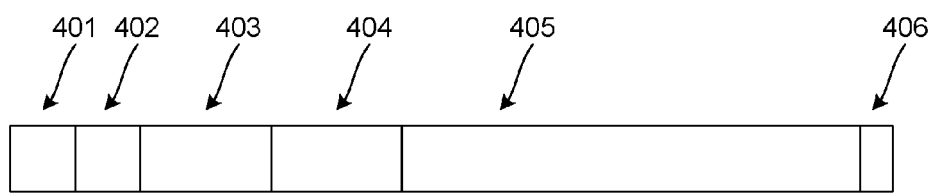
Figure 5:
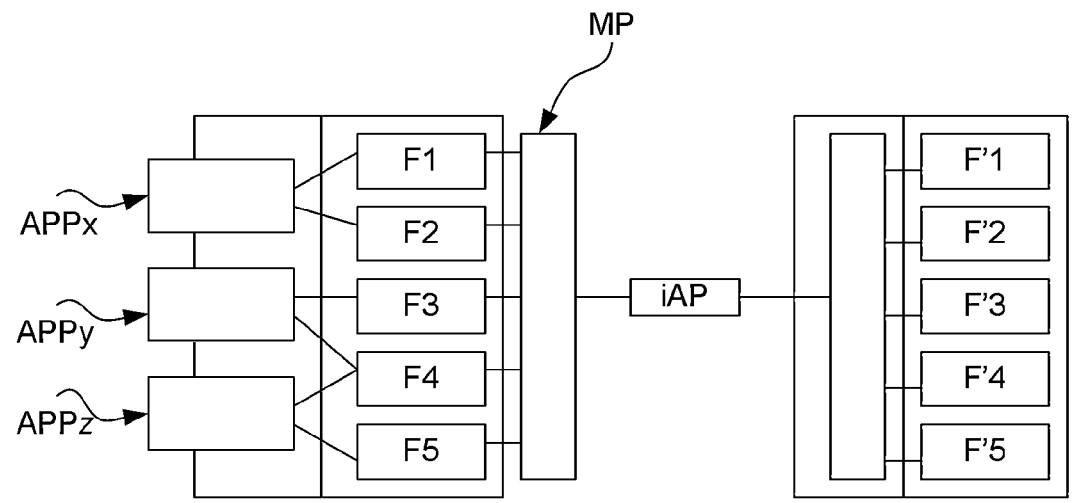
Figure 6:
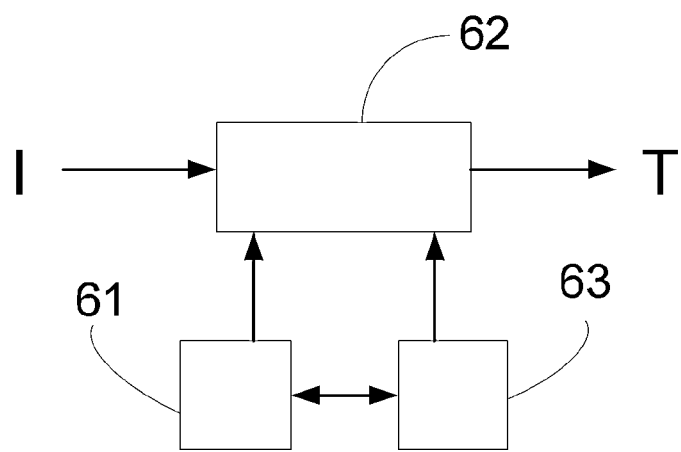

Other characteristics and advantages of the invention shall appear more clearly from the following description of a preferred embodiment, given by way of a simple illustratory and non-exhaustive example and from the appended drawings, of which:

FIG. 1, already presented, illustrates the hardware architecture of a payment system in which a payment terminal operates;

FIG. 2 is a block diagram describing the software layers implemented within a payment terminal;

FIG. 3 describes the multiplexing method according to one embodiment;

FIG. 4 describes the format of an iAP message;

FIG. 5 presents the queues corresponding to the virtual channels created during the implementation of the multiplexing;

FIG. 6 provides a brief description of the hardware architecture of the multiplexing device.

DETAILED DESCRIPTION OF THE INVENTION 1.1 Reminder of the Principle of the Invention The invention pursues the goal of reutilizing an existing payment terminal to be paired with a communications terminal (for example an iPod™ or an iPhone™) without its being necessary to certify (as understood in the term "PCI/PED certification") the unit constituted by the communications terminal and the payment terminal.

To this end, the invention proposes to implement a multiplexing device which carries out a two-way multiplexing of messages exchanged between the payment terminal and the communications terminal. The software architecture proposed enables the reutilization of existing applications already approved for solutions working when the communications terminal and the payment terminal carry out IP (or stack IP) data exchanges with mobile products that do not allow directly for the use of "stack IP" (iPhone™ type).

More particularly, the multiplexing is implemented by means of the iAP protocol which is the source of the problem (the bottleneck formed by iAP) to which the invention seeks to bring a solution. Thus, the payment terminal is seen as an accessory to the communications terminal. In fact, the communications terminal, which includes numerous functions that cannot be present in the payment terminal, can advantageously complement the working of the payment terminal.

The multiplexing device implements a succession of steps leading to the transmission and/or reception by the payment terminal of data for and coming from the communications terminal. According to a particular embodiment, the method for message multiplexing by means of a connection using the iAP protocol comprises: the iPod Accessory Protocol/iAP (also known as the Apple Accessory Protocol/AAP) used for communications between iPod™/iPhone™ and accessories such as docking stations and adaptors for motor vehicles. The iAP is used chiefly to control the reading of the iPod/iPhone and to transfer data such as metadata on the track being read and album covers. With the recent versions of the iAP, it is also possible for accessories to communicate with applications working on the iPhone OS.

However, the iAP and its implementation on Apple terminals suffer from a major problem: the bit rate. Indeed, the iAP has a limited bit rate ranging from 19,200 to 57,600 bauds approximately depending on the versions used and the data to be transmitted. Indeed, the communications between the terminals and the accessories is done by means of an RS232 interface (a serial interface) that the iAP uses.

Now, this interface is not adapted to data transmission between a payment terminal and a communications terminal. This data transmission must rather be obtained through an USB interface. This USB interface enables high-speed transmission of large volumes of data. More particularly, the communications terminal and the payment terminal are connected to each other by means of a USB interface and data transmission is done by means of an emulation of a series link in implementing the PPP (Point-to-Point Protocol), which itself implements the IP (Internet Protocol) which enables the payment terminal and the communications terminal to have an IP address each. For their part, the pieces of data of variable length are transmitted according to the TLV (Type-Length-Value) technique.

In other words, the USB link between the two terminals is of course faster but many data encapsulations are made. The leads to a fairly substantial loss of efficiency of the USB link: the numerous encapsulations (IP, PPP, USB) do not enable the use of the same techniques for transmission through an RS232 interface.

In addition, "lingos" need to be used in order to be able to communicate with Apple terminals. The iAP protocol defines four "lingos" which are channels for exchanging data between the Apple™ communications terminal (iPhone™, iPod™ etc) and the accessory (docking station, headset, etc) connected to the communications terminal. The four lingos; General Lingo (generic lingo), Display Remote Lingo (display transfer), Extended Interface Lingo (extended interface), Digital Audio Lingo (transmission of audio data. It is not possible to use other means of communication with the communications terminal. The inventors have therefore implemented a technique to enable a data transmission suited to the payment terminal. Indeed, the transmission means (the lingos) offered by the communications terminal using the iAP protocol are clearly not suited to an implementation of payment applications.

Thus, the invention proposes to implement a link layer which makes it possible to take charge of data transmission between the payment terminal and the communications terminal. This link layer makes it possible to manage the data stream (in the form of FLV frames) that is transmitted between the terminals.

Referring to FIG. 2, we present a block diagram describing the software layers implemented within the payment terminal according to one embodiment.

The software layers comprise a layer known as a "low level" layer comprising software modules that directly interact with the hardware components of the terminal. This "low level" layer enables the hardware devices of the payment terminal to be driven and comprises drivers. This "low level" software layer is used by means of an operating system (OS). The operating system comprises especially libraries. The operating system is itself used by an applications manager which controls the different applications of the payment terminal. Among possible applications, we can cite payment applications (simple, deferred by instalment), the management of loyalty cards, electronic wallets, etc.

1.2 Description of One Embodiment

To enable the transmission of data by means of a "serial" type link, not adapted to this use in the context of a link between a payment terminal and an iPod™ or iPhone™ type communications terminal, the invention proposes in this embodiment to implement a multiplexing of the messages.

More particularly, since the goal is to be able to reutilize an existing payment terminal for pairing with a communications terminal (iPod™ or iPhone™) without being required to certify the unit constituted by the communications terminal and the payment terminal (as understood in PCI/PED certifications), the inventors provide a simple solution that can be updated. To this end, the inventors have implemented a multiplexing device which acts as an interface between the payment terminal and the iPhone™ or the iPod™.

More particularly, in one embodiment, this interface is an interface module, either software or hardware, that makes it possible firstly to transmit and receive messages to and from the mobile terminal. According to a first particular embodiment, the multiplexing device is implemented within the payment terminal. It therefore benefits from the safety measures implemented within the payment terminal (measures taken to enable the PCI-PED certification). According to a particular second embodiment, the interface multiplexing device is implemented in an electronic connection board between the payment terminal and the mobile terminal. In this second embodiment, the electronic connection board comprises a printed circuit to which the following are attached:
 a first connector to connect the card to the payment device,
 a second connector to connect the card to the communications terminal, and
 a third connector to connect the card to an external device (for example a charger).

According to the invention, the interface multiplexing device is configured to implement a method for multiplexing messages between the payment terminal and the mobile terminal. This multiplexing method, presented with reference to FIG. 3, comprises the following steps as seen from the payment terminal:
 a step for initializing (311) an external communications interface with said communications terminal;
 a first step of transmission (312) to said communications terminal of a request for creating remote virtual channels by means of said external communications interface;
 a step (313) for creating, within said payment terminal, local virtual channels corresponding to said remote virtual channels;

a second step (32) for transmitting data frames associated with said local virtual channels by means of said external communications interface.

Thus, the payment terminal is capable of transmitting data to the communications terminal by means of virtual channels.

The following is the list of virtual channels:
- a "transaction" virtual channel to send and receive data pertaining to bank transactions;
- a "configuration" virtual channel to enable the exchange of service information (synchronization, updating, etc);
- an "SSL" channel eponymously named after the protocol, to secure data transmission between the payment terminal and the communications terminal;
- a "printer" channel to transmit data known as printing data such as data resulting from a transaction (commonly called a "card receipt");
- a "barcode" virtual channel to enable management of the reading of the barcodes when the payment terminal has a barcode reader.

Prior to initializing the external communications interface with the communications terminal, the method of the invention further comprises a first step for authenticating (30) said payment terminal relative to said communications terminal. This step is used to make sure that the payment terminal is authorized to be coupled with the communications terminal.

This first step for authenticating (30) comprises, as seen from the payment terminal, a step (301) for obtaining a certificate (for example from a dedicated processor situated within the payment terminal) and a challenge/response type verification step (302) in which the communications terminal verifies the authorization of the payment terminal to be paired. The processor dedicated to this purpose that is installed within the payment terminal can be a processor provided by the manufacturer of the communications terminal (e.g. Apple™).

This first step for authenticating can advantageously be followed, in one specific embodiment of the invention that is not shown, by a second step for authenticating in which the burden of proof will not be on the payment terminal side but on the communications terminal side. This second step will thus be aimed at ensuring that the communications terminal is truly entitled to be paired with the payment terminal with which it is paired. This step for authenticating can also be of the "challenge/response" type or of any other appropriate type. This second step for authenticating can advantageously use cryptographic equipment included in the SIM card of the communications terminal. Thus, this use for purposes of mutual authentication averts the need to place sensitive data in the communications terminal (not designed for this purpose) and to develop a costly solution to this end.

According to one embodiment of the invention, after the step for creating (313) virtual channels, within said payment terminal, that correspond to said virtual channels created by the communications terminal, the method for multiplexing comprises a step of verification (321), within said virtual channels, of a presence of an FLV frame intended for the communications terminal and, when one of the channels comprises a frame of this kind, a step for encapsulating (322) this frame FLV in an iAP message (3221).

According to one particular embodiment of the invention, the format of the iAP message transmitted (3221), presented with reference to FIG. 4, is the following:
- a "lingo" identifier (401) with a length of 1 byte;
- a frame identifier (402) with a length of 1 byte;
- a transaction identifier (403) with a length of 2 bytes;
- a session identifier (corresponding to the virtual channel number 404)) with a length of 2 bytes;
- data of variable length TLV (405);
- a CRC integrity check code (406).

Thus, the encapsulation data is greatly minimized and therefore more payload data is transmitted in a restricted physical channel.

According to one embodiment of the invention, the method of multiplexing also comprises, on the communications terminal side, a step for verifying (323) a presence, within virtual channels of the communications terminal, of an FLV frame intended for the payment terminal and when one of the channels comprises such a frame, a step for encapsulating (324) this FLV frame in an iAP message.

Thus, the communications interface is used as a two-way interface.

More particularly, in one particular embodiment described with reference to FIG. 5, the virtual channels are created in the form of a plurality of FIFO type queues (F1 to F5 on the payment terminal side and F'1 to F'5 on the communications terminal side). These queues work as follows.

The queues are invisible from the viewpoint of the applications (APPx, APPy, APPz) of the payment terminal. This is why these applications, which have already been certified, do not need to be modified. Indeed, the applications of the payment terminal use data transmission channels. Thus, for the applications of the payment terminal, the operation is identical to the previous operation: the applications use the channels that they need in order to be executed.

The difference lies in the form taken by the channel. Indeed, whereas the channel used to be a real path of data transmission between two apparatuses, the invention now gives the channel the form of a FIFO type queue. There are therefore for example five queues (i.e. as many queues as there are virtual channels) in which the FLV frames are inserted (by applications of the payment terminal) or obtained (coming from the communications terminal). The queues are managed by the multiplexing device (MP). This device takes responsibility for verifying the content of the queues (F1 to F5), encapsulating the FLV frames in the form of messages preliminarily described with reference to FIG. 4 and transmitting these messages to the communications terminal. Conversely, it receives the iAP messages from the communications terminal and identifies the queue (F1 to F5) in which the FLV frame contained in this message must be inserted. It decapsulates the iAP message (i.e. it removes the FLV header information) and, using the virtual channel number contained in the message, places the FLV frame in the queue. The application for which this FLV frame is intended retrieves it for processing and the FLV frame is erased from the queue by the multiplexing device. The multiplexing device can be implemented in the form of a hardware component or a software component.

1.3 Other Optional Characteristics and Advantages

Referring to FIG. 6, an embodiment is presented of a multiplexing device according to the invention.

For example, the multiplexing device comprises a memory 61 constituted by a buffer memory, a processing unit 62, equipped for example with a microprocessor and a random-access memory, and driven by the computer program 62, implementing a method of multiplexing according to the invention.

At initialization, the computer program code instructions 63 are for example loaded into a memory and then executed by the processor of the processing unit 62.

The processing unit 62 inputs a frame FLV, sent by an application of the payment terminal. This frame FLV is originally intended for transmission by a communications channel. The device intercepts this FLV frame and stores it in a queue corresponding to the virtual channel which emulates the communications channel.

The processing unit 62 performs a encapsulation in parallel, in the form of an iAP message of the FLV frame that has just been inserted into the queue, and transmits this iAP message to the communications terminal. According to one embodiment of the invention, this transmission is implemented by means of the "generic" lingo of the iAP protocol.

The microprocessor of the processing unit 62 implements the steps of the multiplexing method to enable the transmission of the iAP messages according to the instructions of a computer program 63.

To this end the multiplexing device comprises, in addition to the buffer memory 61, means for initializing an external communications interface with said communications terminal, means of transmission (312) of a request for creating remote virtual channels, from said payment terminal to said communications terminal through said external communications interface, means for creating, within said payment terminal, local virtual channels corresponding to said remote virtual channels, means of transmission of associated data frames to said local virtual channels through said external communications interface. These means are driven by the microprocessor of the processing unit 62.

The present invention, in at least one embodiment, does not have the prior-art drawbacks discussed above.

Although the present disclosure has been described with reference to one or more examples, workers skilled in the art will recognize that changes may be made in form and detail without departing from the scope of the disclosure and/or the appended claims.

The invention claimed is:

1. A method for multiplexing messages exchanged between a payment terminal and a communications terminal through a connection between said payment terminal and said communications terminal using the iAP protocol, wherein the method comprises:
   a step of initializing an external communications interface with said communications terminal;
   a first step of transmission of a request for creating remote virtual channels, from said payment terminal to said communications terminal through said external communications interface;
   a step of creating, within said payment terminal, local virtual channels corresponding to said remote virtual channels; and
   a second step of transmission of associated data frames to said local virtual channels by using said external communications interface.

2. The method according to claim 1, wherein said external communications interface is an RS232 interface.

3. The method according to claim 1, wherein the method further comprises, prior to said step of initializing a communications interface, a step of authenticating said payment terminal in relation to said communications terminal comprising:
   a step of obtaining an authentication certificate; and
   a step of verifying the authorization of the payment terminal to be paired with said communications terminal using said authentication certificate.

4. The method according to claim 1, wherein said second step of transmission of associated data frames to said local virtual channels comprises:
   a step of verifying a presence, within said virtual channels, of an FLV frame intended for the communications terminal;
   and when one of the channels comprises such a frame:
   a step of encapsulating this FLV frame in an iAP message.

5. The method according to claim 1, wherein said virtual channels belong to the group consisting of:
   a virtual "transaction" channel for exchanging data on banking transactions;
   a virtual "configuration" channel for exchanging pieces of service information;
   a virtual "SSL" channel for encrypting data transmission between said payment terminal and said communications terminal;
   a virtual "printer" channel for transmitting printing data;
   a virtual "barcode" channel for managing the reading of the barcodes.

6. The method according to claim 1, wherein a virtual channel is created in the form of a queue, said queue being configured to enable reception, recording and erasure of FLV frames intended for said virtual channel.

7. A device for multiplexing messages exchanged between a payment terminal and a communications terminal by means of a connection between said payment terminal and said communications terminal using the iAP protocol, wherein the device comprises:
   means for initializing an external communications interface with said communications terminal;
   first means for transmission of a request for creating remote virtual channels, from said payment terminal to said communications terminal through said external communications interface;
   means for creating, within said payment terminal, local virtual channels corresponding to said remote virtual channels; and
   second means for transmission of associated data frames to said local virtual channels through said external communications interface.

8. A non-transmissible information carrier storage device comprising a computer program product stored thereon and comprising program code instructions for execution of a method for multiplexing messages exchanged between a payment terminal and a communications terminal through a connection between said payment terminal and said communications terminal using the iAP protocol, when the instructions are executed on a computer, wherein the method comprises:
   a step of initializing an external communications interface with said communications terminal;
   a first step of transmission of a request for creating remote virtual channels, from said payment terminal to said communications terminal through said external communications interface;
   a step of creating, within said payment terminal, local virtual channels corresponding to said remote virtual channels; and
   a second step of transmission of associated data frames to said local virtual channels by using said external communications interface.

* * * * *